United States Patent
Yarimi et al.

(10) Patent No.: US 11,144,399 B1
(45) Date of Patent: Oct. 12, 2021

(54) MANAGING STORAGE DEVICE ERRORS DURING PROCESSING OF INFLIGHT INPUT/OUTPUT REQUESTS

(71) Applicant: EMC IP Holding Company LLC, Hopkinton, MA (US)

(72) Inventors: Michal Yarimi, Rehovot (IL); Itay Keller, Tel Aviv (IL); Yuval Miron, Tel Aviv-Jaffa (IL); Neta Peleg, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/832,763

(22) Filed: Mar. 27, 2020

(51) Int. Cl.
| | |
|---|---|
| *G06F 11/00* | (2006.01) |
| *G06F 11/14* | (2006.01) |
| *G06F 11/07* | (2006.01) |
| *G06F 12/02* | (2006.01) |
| *G06F 12/1045* | (2016.01) |
| *G06F 11/30* | (2006.01) |

(52) U.S. Cl.
CPC ........ *G06F 11/142* (2013.01); *G06F 11/0772* (2013.01); *G06F 11/3041* (2013.01); *G06F 12/0292* (2013.01); *G06F 12/1054* (2013.01); *G06F 2212/7201* (2013.01)

(58) Field of Classification Search
CPC ............... G06F 11/108; G06F 11/1068; G06F 11/1092; G06F 11/2094; G06F 11/1658; G06F 11/1666
See application file for complete search history.

(56) References Cited

U.S. PATENT DOCUMENTS

| | | | |
|---|---|---|---|
| 5,551,003 A | 8/1996 | Mattson et al. | |
| 5,764,880 A | 6/1998 | Gerdt et al. | |
| 6,052,799 A | 4/2000 | Li et al. | |
| 6,243,827 B1 * | 6/2001 | Renner, Jr. ............ | G06F 11/004 |
| | | | 714/6.12 |

(Continued)

FOREIGN PATENT DOCUMENTS

| | | |
|---|---|---|
| WO | PCT/US2019/024885 | 1/2020 |
| WO | PCT/US2019/024900 | 1/2020 |

OTHER PUBLICATIONS

Dell EMC, "Dell EMC VxRack FLEX," Dell EMC Product Overview, 2018, 5 pages.

(Continued)

*Primary Examiner* — Charles Ehne
(74) *Attorney, Agent, or Firm* — Ryan, Mason & Lewis, LLP

(57) ABSTRACT

Techniques are provided for managing storage device errors during processing of inflight input/output (I/O) operations. A storage control system (e.g., a software-defined storage system) receives an I/O write request which includes data to be written to at least one storage device of a plurality of storage devices managed by the storage control system, and commences a write operation to write the data to the at least one storage device. In response to a storage device I/O error resulting from a failure of the write operation associated with the at least one storage device, the storage control system accesses a logical storage device in a non-volatile system memory device, and writes the data to the logical storage device in the non-volatile system memory device to complete the failed write operation.

20 Claims, 4 Drawing Sheets

(56) References Cited

U.S. PATENT DOCUMENTS

| | | | |
|---|---|---|---|
| 6,941,420 | B2 | 9/2005 | Butterworth et al. |
| 8,843,676 | B2 | 9/2014 | Rajamanickam et al. |
| 9,372,751 | B2 | 6/2016 | McNutt |
| 9,514,014 | B2 | 12/2016 | Webman et al. |
| 10,445,180 | B2 | 10/2019 | Butterworth et al. |
| 2002/0032835 | A1 | 3/2002 | Li et al. |
| 2015/0269025 | A1* | 9/2015 | Krishnamurthy ..... G06F 3/0689 714/6.24 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |
| 2020/0218617 | A1* | 7/2020 | Knestele ............... G06F 9/5027 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 12 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006. 1598129, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."

U.S. Appl. No. 16/807,709 filed in the name of Avi Puder et al. filed Mar. 3, 2020, and entitled "Management of Shared Resources in a Software-Defined Storage Environment."

U.S. Appl. No. 16/822,818 filed in the name of Itay Keller et al. filed Mar. 18, 2020, and entitled "Storage System Implementing Snapshot Longevity Ranking for Efficient Management of Snapshots."

U.S. Appl. No. 16/822,848 filed in the name of Itay Keller et al. filed Mar. 18, 2020, and entitled "Assignment of Longevity Ranking Values of Storage Volume Snapshots Based on Snapshot Policies."

U.S. Appl. No. 16/823,813 filed in the name of Itay Keller et al. filed Mar. 19, 2020, and entitled "Managing Incompressible Data in a Compression-Enabled Log-Structured Array Storage System."

U.S. Appl. No. 16/830,469 filed in the name of Roi Tagar et al. filed Mar. 26, 2020, and entitled "Storage Block Balancing Using Volume Part Migration."

U.S. Appl. No. 16/830,473 filed in the name of Yugal Peleg Lieblich et al. filed Mar. 26, 2020, and entitled "Replicated State Cluster with Standby Node State Assessment During Leadership Transition."

U.S. Appl. No. 16/830,946 filed in the name of Gil BenZeev et al. filed Mar. 26, 2020, and entitled "Storage Volume Migration Scheduling Based on Storage Volume Priorities and Specified Constraints."

* cited by examiner

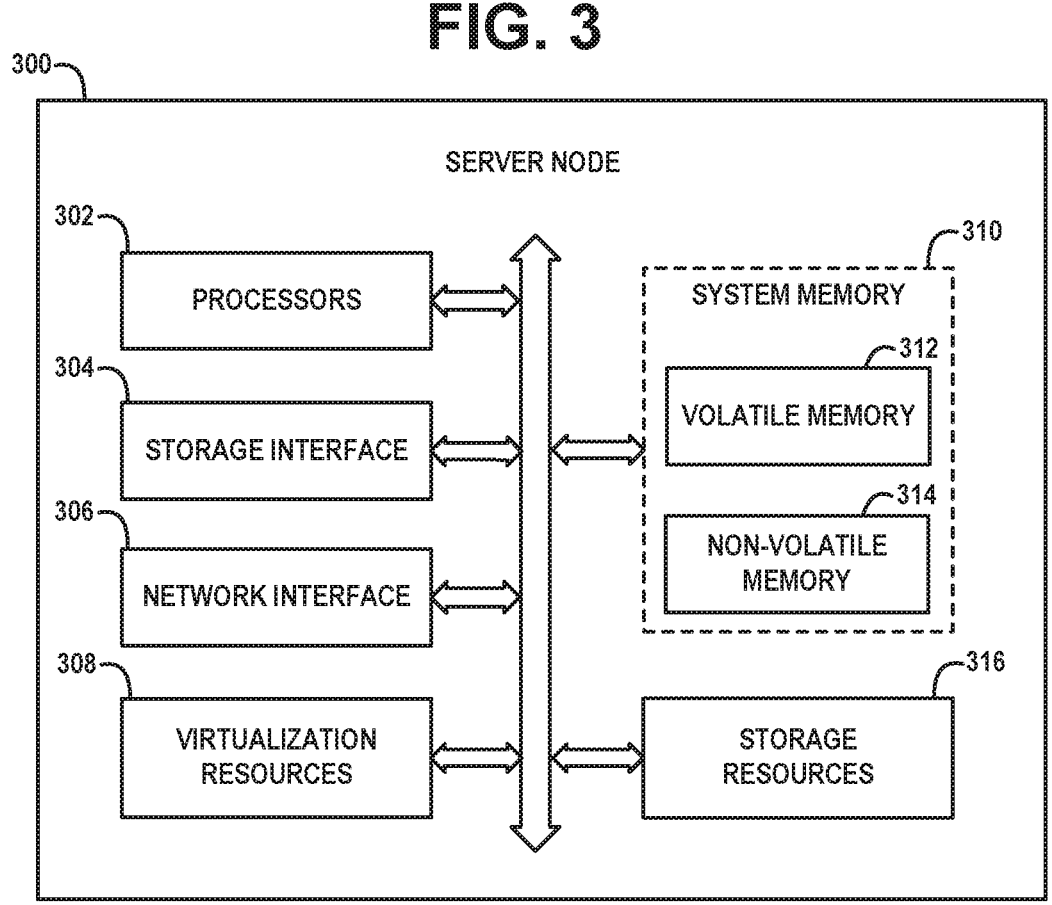

MANAGING STORAGE DEVICE ERRORS DURING PROCESSING OF INFLIGHT INPUT/OUTPUT REQUESTS

FIELD

This disclosure relates generally to data storage management techniques and, more specifically, to techniques for managing storage device errors in a data storage system.

BACKGROUND

Data storage systems typically implement various automated resource management techniques to ensure that data is not corrupted and remains coherent and complete. In a distributed data storage system comprising a cluster of data storage servers, the distributed data storage system is capable of concurrently handling many inflight input/output (I/O) requests which can spawn thousands of concurrent I/O threads for performing data access operations (e.g., read operations, write operations, etc.) to access data in various storage devices distributed over a storage network such as a storage area network (SAN).

In certain instances, a storage device I/O error will occur due to, e.g., a malfunctioning storage device, in which case a file layer of the data storage server is unable to execute or otherwise complete a given inflight I/O request (e.g., read request or write request) when attempting to access the malfunctioning storage device. A given I/O thread handing the inflight I/O request can encounter the storage device I/O error in the middle of an open transaction, while other I/O threads concurrently handling other inflight I/O requests are not aware of such error. The term "transaction" as used herein refers to group of operations for which their execution must be either completed fully or not at all, so that data can remain consistent and coherent. A given transaction may include one or more I/O operations. When an I/O operation of a given transaction encounters a device I/O error and the transaction cannot be completed, backing off from the failed I/O operation can leave the data storage system in an unstable state in instances where a data storage control system does not support the rollback of other completed I/O operations of the given transaction. Typically, the operations of a given transaction are executed on top of different underlying storage mediums, such that the operations might have different resiliencies (e.g., some operations are volatile and some are not), and when the completion of the transaction is promised, a failure in one of the operations of the given transaction must be recovered or roll backwards to ensure consistency.

An intuitive solution to address an I/O error may be to terminate a running process when a device I/O error occurs. However, this is not desired if the process is able to finish ongoing operations. Another approach is to roll back the operations after encountering the storage device I/O error. There are various problems with this approach. For example, rolling back operations can be complicated because not all I/O operations can be readily undone, especially when memory allocation was involved, or when an acknowledge (ACK) message had already been returned to a user. Further, in a distributed system which executes I/O threads and processes in parallel, a parallel process that is not aware of the malfunction will proceed to execute operations, thereby resulting in further complications and issues in rolling back I/O operations.

SUMMARY

Exemplary embodiments of the disclosure generally include techniques for managing storage device errors during processing of inflight I/O operations. For example, one exemplary embodiment includes a process that is implemented by a storage control system (e.g., a software-defined storage system). The storage control system receives an I/O write request which includes data to be written to at least one storage device of a plurality of storage devices managed by the storage control system, and commences a write operation to write the data to the at least one storage device. In response to a storage device I/O error resulting from a failure of the write operation associated with the at least one storage device, the storage control system accesses a logical storage device in a non-volatile system memory device, and writes the data to the logical storage device in the non-volatile system memory device to complete the failed write operation.

Other embodiments of the disclosure include, without limitation, server nodes, and articles of manufacture comprising processor-readable storage media for managing storage device errors during processing of inflight I/O operations.

BRIEF DESCRIPTION OF THE DRAWINGS

FIG. 3 schematically illustrates framework of a server node which hosts a data storage system that is configured to manage storage device errors during processing of inflight I/O operations, according to an exemplary embodiment of the disclosure.

DETAILED DESCRIPTION

Figure 1A:
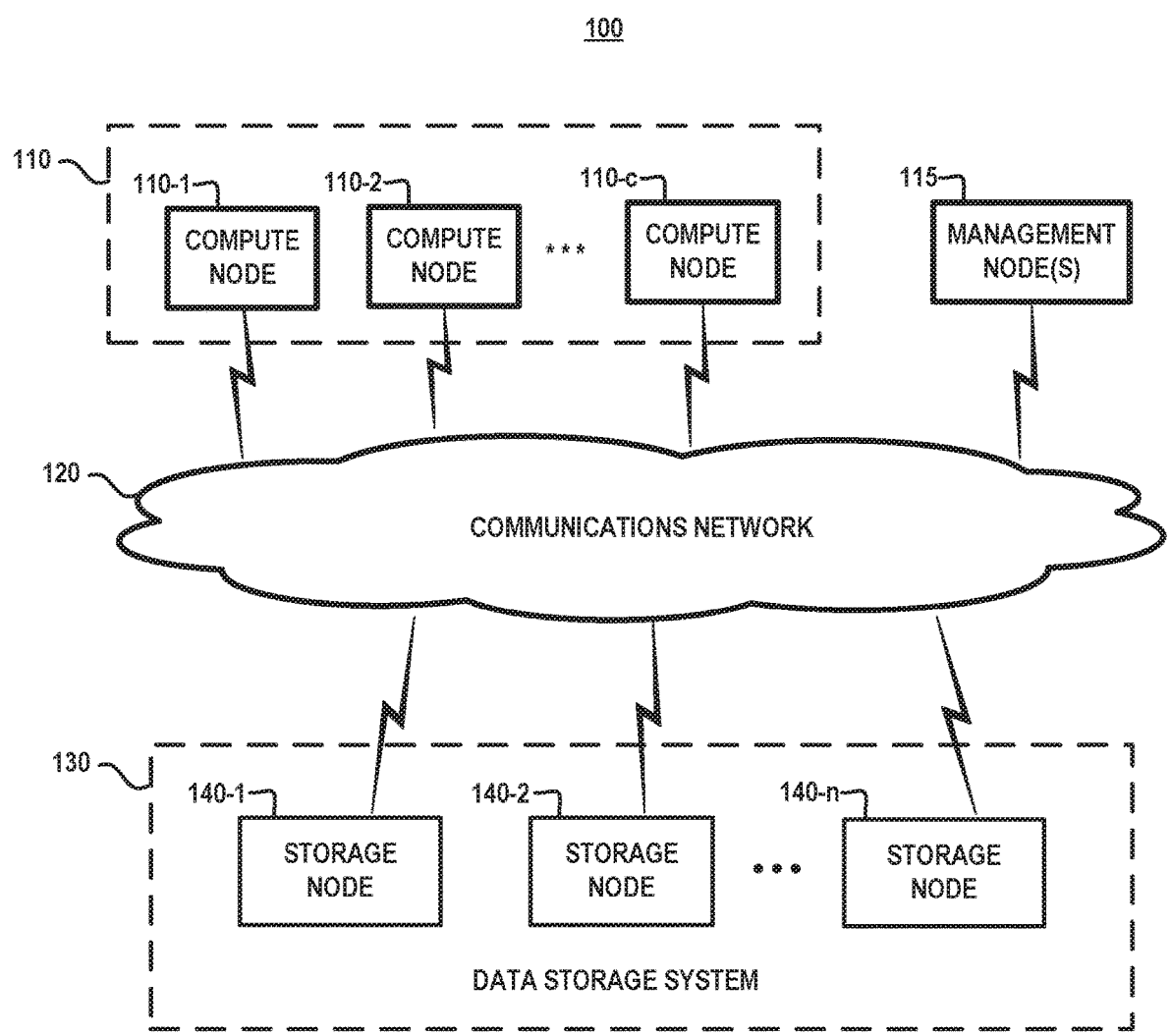
FIGS. 1A and 1B schematically illustrate an information processing system comprising a data storage system which is configured to manage storage device errors during processing of inflight I/O operations, according to an exemplary embodiment of the disclosure.
Figure 1B:
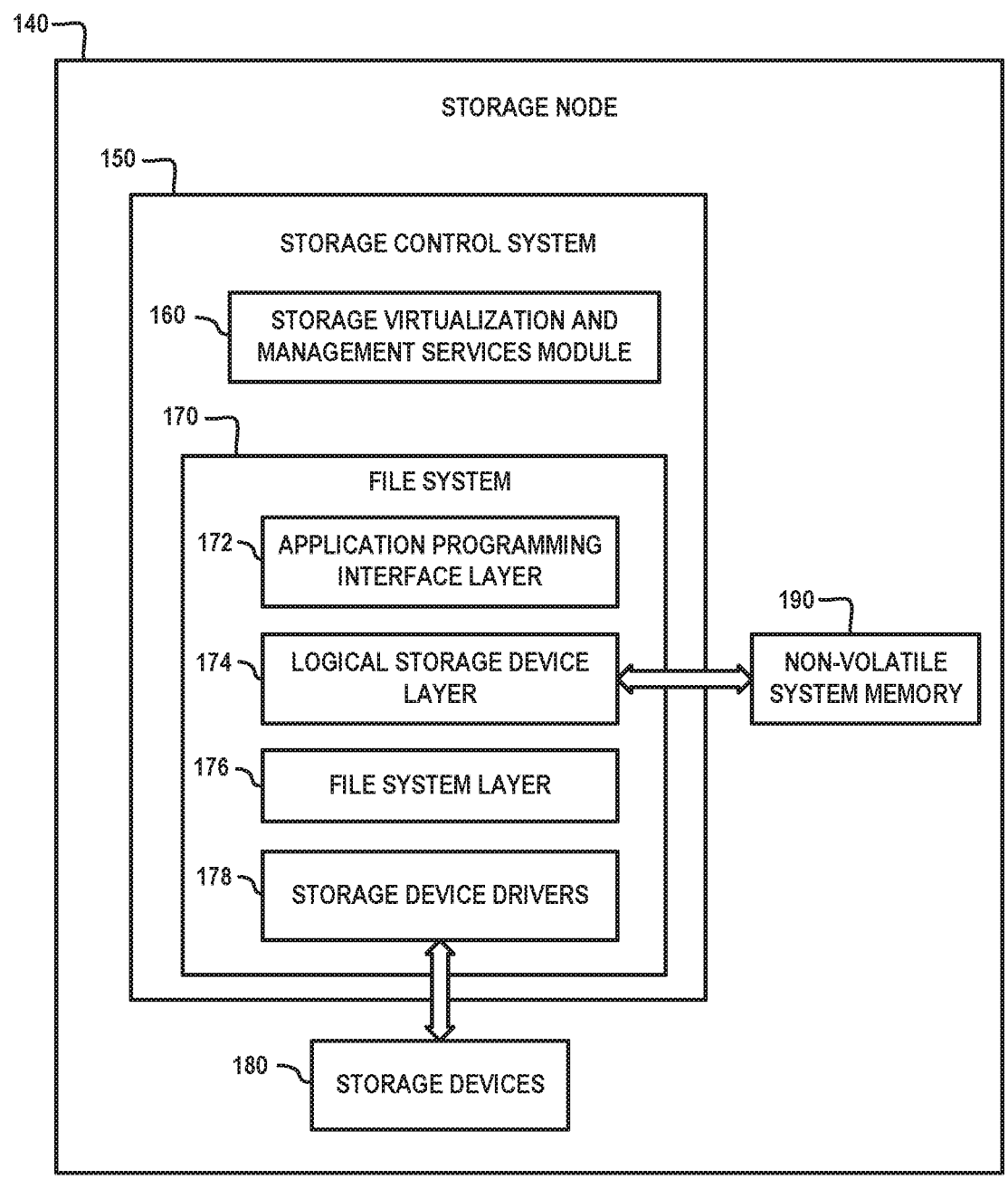

Exemplary embodiments will be described herein with reference to exemplary information processing systems that implement data storage systems which are configured to manage storage device errors during processing of inflight I/O operations, and which implement associated computers, servers, storage devices and other processing devices. It is to be appreciated, however, that these and other exemplary embodiments are not restricted to the particular illustrative system and device configurations shown in the figures. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein. FIGS. 1A and 1B schematically illustrate an information processing system comprising a data storage system which is configured to manage storage device errors during processing of inflight I/O operations, according to an exemplary embodiment of the disclosure. More specifically, FIG. 1A schematically illustrates an information processing system 100 which comprises a plurality of compute nodes 110-1, 110-2, . . . , 110-c (collectively referred to as compute nodes 110), one or more management nodes 115, a communications network 120, and a data storage system 130. The data storage system 130 comprises a plurality of storage nodes 140-1, 140-2, . . . , 140-n (collectively referred to as storage nodes 140, or each singularly referred to as storage node 140). In the context of the exemplary embodiments described herein, the storage nodes 140 of the data storage system 130 implement methods for managing and recovering from storage device errors that are encountered during processing of inflight I/O operations. FIG. 1B schematically illustrates an exemplary framework of at least one or more of the storage nodes 140.

In particular, as shown in FIG. 1B, the storage node 140 comprises a storage control system 150 comprising a storage virtualization and management services module 160 and a file system 170. The storage node 140 further comprises a plurality of storage devices 180 and system memory comprising non-volatile system memory 190. The file system 170 is configured to manage how data is stored and organized on the storage devices 180 and to control data access operations for writing data to and reading data from the storage devices 180. The file system 170 comprises an application programming interface (API) layer 172 (e.g., logical file system layer), a logical storage device layer 174, a file system layer 176, and device drivers 178. As explained in further detail below, the logical storage device layer 174 and the non-volatile system memory 190 are configured to manage storage device errors that may occur in connection with one or more of the storage device 180 during processing of inflight I/O operations (e.g., when performing an I/O write operation to a storage device 180). It is to be noted that the storage control system 150 may include additional modules and other components that are typically included in various implementations of storage control systems (e.g., software-defined storage systems), although such additional modules and other components are omitted for clarity and simplicity of illustration.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue I/O requests that are processed by a corresponding one of the storage nodes 140. The term I/O request as used herein refers to at least one of input and output. For example, an I/O request may comprise a write request and/or a read request directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly construed and not viewed as being limited to storage systems of any particular type or types. A storage system in some embodiments can be implemented using a combination of storage nodes and compute nodes. In some embodiments, the storage nodes 140 comprise storage server nodes (e.g., server node 300, shown in FIG. 3) having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed as a server node (e.g., physical server machine) with local persistent storage devices (e.g., HDDs, SSDs, etc.) and a storage control system that is configured to manage and control access to the local persistence storage devices. A storage node may comprise one or more compute nodes to process data and execute tasks/workloads.

In some embodiments, as schematically illustrated in FIG. 1B, the storage node 140 is a physical server node or storage appliance, wherein the storage devices 180 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 180 may be implemented in the storage node 140. In this regard, the term "storage device" as used herein is intended to be broadly construed, so as to encompass, for example, SSDs, HDDs, flash drives, hybrid drives or other types of storage media. The data storage devices 180 are connected to the storage node 140 through any suitable host interface, e.g., a host bus adapter, using suitable protocols such as ATA, SATA, eSATA, NVMe, SCSI, SAS, etc. In other embodiments, the storage node 140 can be network connected to one or more NAS nodes over a local area network.

The storage control system 150 is configured to manage the storage devices 180 and control I/O access to the storage devices 180 and/or other storage resources (e.g., DAS or NAS resources) that are directly attached or network-connected to the storage node 140. In some embodiments, the storage control system 150 is a component (e.g., storage data server) of a software-defined storage (SDS) system which supports the virtualization of the storage devices 180 by separating the control and management software from the underlying hardware architecture of the storage devices 180. The storage control system 150 runs on a server operating system of the storage node 140 to provide storage services. More specifically, in a software-defined storage environment, the storage control system 150 comprises a storage data server that is configured to abstract storage access services from the underlying storage hardware, and thereby control and manage I/O requests issued by the compute nodes 110, as well as support networking and connectivity. In this instance, the storage control system 150 comprises a software layer that is hosted by the storage node 140 and deployed in the data path between the compute nodes 110 and the storage devices 180 of the storage node 140, wherein the storage control system 150 is configured to process I/O requests from the compute nodes 110 by accessing the storage devices 180 to store/retrieve data to/from the storage devices 180 based on the I/O requests.

In a software-defined storage environment, the storage control system 150 comprises a storage data server that is installed on each storage node that will contribute its storage to the data storage system. The storage control system 150 is configured to provision, orchestrate and manage the local storage resources (e.g., the storage devices 180) of the storage node 140. For example, the storage control system 150 implements methods that are configured to create and manage storage pools (e.g., virtual pools of block storage) by aggregating capacity from the storage devices 180. The storage control system 150 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In the software-defined storage environment, each of the storage nodes 140 in FIG. 1A can run an instance of the storage control system 150 to convert the respective local storage resources (e.g., DAS storage devices and/or NAS storage devices) of the storage nodes 140 into local block storage. Each instance of the storage control system 150 contributes some or all of its local block storage (HDDs, SSDs, PCIe, NVMe and flash cards) to an aggregated pool of storage of a storage server node cluster (e.g., cluster of storage nodes 140) to implement a server-based SAN (e.g., virtual SAN). In this configuration, each storage node 140 is part of a loosely coupled server cluster which enables "scale-out" of the software-defined storage environment, wherein each instance of the storage control system 150 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage control systems 150 operating as storage data servers to create and expose volumes of a storage layer, the software-defined storage environment comprises other components such as (i) data storage clients that consume the storage layer and (ii) metadata managers that coordinate the storage layer. More specifically, on the client-side (e.g., compute nodes 110), an SDS data storage client (SDC) is a lightweight block device driver that is deployed on each node (e.g., server node) that consumes the shared block storage volumes that are exposed by the storage control systems 150 of the storage nodes 140. In particular, the SDCs run on the same hosts (e.g., servers) as the compute nodes 110 which require access to the block devices that are exposed and managed by the storage control systems 150 of the storage nodes 140. The SDC exposes block devices representing the virtual storage volumes that are currently mapped to that host. In particular, the SDC serves as a block driver for a client (server), wherein the SDC intercepts I/O requests issued by a compute node 110, and utilizes the intercepted I/O request to access the block storage that is managed by the storage control systems 150. The SDC provides the operating system or hypervisor (which runs the SDC) access to the logical block devices (e.g., volumes).

In the software-defined storage environment, the primary data and copies of each storage volume are distributed over the storage nodes 140, and each SDC has knowledge of which SDS data storage server (e.g., storage control system 150) holds its block data, so multipathing can be accomplished natively through the SDCs. In particular, each SDC knows how to direct an I/O request to the relevant destination SDS storage data server (e.g., storage control system 150). In this regard, there is no central point of routing, and each SDC performs is own routing independent from any other SDC. This implementation prevents unnecessary network traffic and redundant.

SDS resource usage. Each SDC maintains peer-to-peer connections to every storage control system 150 that manages the storage pool so each SDC can communicate over multiple pathways to all of the storage nodes 140 which store the data. The multi-point peer-to-peer communication fashion allows the SDCs to read and write data to and from all points simultaneously, eliminating bottlenecks and quickly routing around failed paths.

The management nodes 115 in FIG. 1A implement a management layer that is configured to manage and configured the storage environment 100. In some embodiments, the management nodes 115 comprise the SDS metadata manager components, wherein the management nodes 115 comprise a tightly-coupled cluster of nodes that are configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that is required for system operation of the SDS environment such as configuration changes, managing the SDS data clients and data servers, device mapping, values, snapshots, system capacity including device allocations and/ or release of capacity, RAID protection, recovery from errors and failures, and system rebuild tasks including rebalancing.

As explained in further detail below, the management nodes 115 are configured to receive notification of storage device errors from the storage control systems 150. In response to such notification of storage device I/O errors, the management nodes 115 will proceed to perform reconfiguration operations to prevent further I/O requests from being directed to storage devices associated with the storage device I/O errors. In addition, the management nodes 115 implement recovery methods to recover from such storage device errors. In some embodiments, the management nodes 115 are implemented on nodes that are separate from the compute nodes 110 and storage nodes 140. In other embodiments, the management nodes 115 can be implemented on the same server nodes as the compute nodes 110 and/or the storage nodes 140.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented consolidate the compute nodes 110, storage nodes 140, and network 120 together in an engineered system. For example, in a hyperconverged deployment, a single-layer deployment is implemented in which the storage data clients and storage data servers (e.g., storage control systems 150) run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, the various modules of the storage control system 150 of FIG. 1B collectively provide data storage and management methods that are configured to perform various function as follows. In particular, the storage virtualization and management services module 160 implements any suitable logical volume management (LVM) system which is configured to create and manage local storage volumes by aggregating the storage devices 180 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data. In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module 160 implements methods to support various data storage management services such as data protection, data migration, data deduplication, replication, thin provisioning, snapshots, data backups, etc.

In some embodiments, the storage devices 180 are configured as block storage devices where raw volumes of storage are created and each block can be controlled as, e.g., an individual disk drive by the storage control system 150. Each block can be individually formatted with a same or different file system as required for the given data storage system application. The file system 170 implements methods and interfaces that execute in user space under the control of the storage control system 150 for (i) organizing the storage space of the storage devices 180 using one or more file system formats (e.g., a structured representation of data and a set of metadata describing the data) and (ii) controlling I/O requests for reading and writing data to the file system.

In general, the file system 170 comprises multiple layers that perform different functions. While FIG. 1B illustrates a general framework of the file system 170, it is to be understood that the number of layers of the file system 170 and the respective functions of the various file system layers can widely vary depending on the type of file system that is implemented for the given application. For example, the file system 170 can be implemented using a global file system framework, a clustered file system framework, a distributed file system framework, etc., depending on the implementation. In all instances of the file system 170 implements various layers to perform fundamental functions.

For example, the API layer 172 comprises a logical layer that is configured to receive and process system calls to manage the file system 170 and to commence file operations such as Create, Open, Close, Read, Write, Remove, etc. In this regard, the API layer 172 essentially provides a system call interface to direct file structure-related system calls to an appropriate endpoint the file system 170 for process.

In some embodiments, the file system layer 176 implements a physical file system layer which is configured to manage and control operation of the storage devices 180. The file system layer 176 processes physical data blocks that are being read from and written to storage. The file system layer 176 handles buffering, caching, and memory managing, and is responsible for the physical placement of data blocks in specific storage locations in the storage space of the storage devices 180. The file system layer 176 interacts with the storage device drivers 178 to drive the storage devices 180. The device drivers 178 implement interface and I/O control functions to communicate with the storage devices 180 to read/write raw data blocks from/to the storage devices 180.

Depending on the type of file system that is implemented, the file system layer 176 comprises various layers that perform distinct fundamental functions. For example, the file system layer 176 comprises a basic file system layer (e.g., block I/O layer) which communicates with the device drivers 178 to retrieve and store raw blocks of data (irrespective of the content of the data blocks). In particular, the basic file system layer comprises a block layer that organizes the storage space into fixed-size blocks. Depending on the type of block storage device (e.g., HDD, SSD, etc.), the block storage device comprises a physical storage space divided into a plurality of logical data blocks (e.g., fixed-size allocation units), wherein the logical data blocks are assigned unique block numbers (e.g., integer values starting from 0) such that each logical data block comprises a separately addressable unit of the physical storage space with a specified block size (e.g., allocation unit size). Each logical data block (e.g., allocation unit) comprises a same number of one or more physical data blocks of the underlying storage media. For HDDs, the allocation units comprise "logical data blocks" that are separately addressed using "logical block addresses." For SSD, the basic allocation units comprise separately addressable pages. Given that block storage devices store information in equal-sized logical data blocks (allocation units), if a given file is smaller than a single logical data block, then the entire logical data block is used to store the file, and the remainder of the logical data block remains unused. If the file is larger than the size of a logical data block, then two or more logical data blocks, which may or may not be contiguous, are used to store the file.

Furthermore, the file system layer 176 comprises a file management layer which implements the file abstraction. The file management layer implements methods and interfaces for organizing data blocks into files. The file management layer generates and manages information regarding files, the logical data blocks associated with a given file, and mapping information for translating from logical to physical blocks. The file management layer maintains a list of free blocks and allocates free blocks to files. The file management layer utilizes a data structure (e.g., inode) to maintain file metadata (e.g., file size, file type, permissions, ownership, etc.) and a data structure (e.g., linked list) to store an ordered list, or array, of block numbers of the logical data blocks that store the data associate with a given file. The files are identified by unique file identifiers (unique file ID, unique inode number, etc.) The file management layer provides higher layers of the file system with file contents that are populated into a buffer.

Moreover, the file system layer 176 comprises a directory layer which implements methods and interfaces to name files with human-readable names and group files into directory structures which map file names to their unique file identifiers (e.g., inode numbers). The directory layer utilizes a filename and associated directory which contains the filename to determine which inode stores the information associated with the filename. An absolute pathname layer is also included in the stack of layers of the file system 170 to implement absolute path lookups to a given filename, starting from root directory (i.e., an absolute pathname is the location of a filesystem object (i.e., file, directory or link) relative to the root directory).

In other embodiments, file system layer 176 may comprise multiple concurrent instances of different physical file systems in certain applications in which the operating system of the storage node 140 must concurrently support multiple types of file systems. In this instance, the file system layer 176 would also include a virtual file system layer on top of the physical file systems, wherein the virtual file system layer comprises an abstract layer that exposes a common interface to multiple different types of physical file systems to enable access to the different types of physical file systems in a uniform manner.

As noted above, the logical storage device layer 174 and the non-volatile system memory 190 are configured to manage storage device errors that may occur in connection with one or more of the storage devices 180 during processing of inflight I/O operations, e.g., when performing an I/O write operation to write a new file or updated file to one of the storage devices 180. Under normal operating conditions, the storage control system 150 will issue system calls to the API layer 172 of the file system 170 to process I/O requests that are issued by the compute nodes 110 (and received from the SDCs) to read or write data to the storage devices 180. The I/O requests are processed by the file system 170 to access the storage devices 180 and perform the requisite I/O operations using known techniques.

When an I/O operation is successfully completed by the file system 170 for a given inflight I/O request, the storage control system 150 will return a status code to the compute node 110 which issued the I/O request to provide notification that the I/O operation was successfully completed. On the other hand, when an I/O write operation directed to a given storage device is not successfully completed, instead of the storage control system 150 returning notification of an I/O error in response to an inflight I/O write request, the logical storage device layer 174 is configured to automatically handle the failed I/O write operation by writing the associated data (e.g., a file) to the non-volatile system memory 190 to complete the I/O write operation. In this regard, when a given storage device fails or is otherwise not accessible, the logical storage device layer 174 and non-volatile system memory 190 are configured to operate in manner that logically emulates the failed storage device and facilitates the completion of write request to the failed storage device. A storage device I/O error can arise if one or more of the storage devices 180 which are the target of the I/O request suffer a hardware failure (e.g., storage device is damage or defective). A storage device I/O error can occur if one of the hardware device drivers are damaged or corrupted. A storage device I/O error can occur if there is a faulty connection (e.g., bad cable or bus) connecting the storage devices 180 to the storage node 140.

The logical storage device layer 174 exposes an API interface that implements various methods to support the handling of failed I/O write operations. It is to be understood that the various API functions of the logical storage device layer 174 can be implemented in the API layer 172 of the file system 170 such that the logical storage device layer 174 and the API layer 172 comprises an integrated API layer. For example, the logical storage device layer 174 exposes an API that allows the file system 170 to issue a "file write" function call to the logical storage device layer 174 when a failed I/O write operation occurs. The "file write" function call performs a process to write the data (e.g., file) associated with the failed I/O write operation to the non-volatile system memory 190.

In some embodiments, the non-volatile system memory 190 comprises a plurality of logical storage devices maintained in respective designated regions of the non-volatile system memory 190, wherein each logical storage device is associated with a respective one of the plurality of storage devices 180 managed by the storage control system 150. In addition, each logical storage device comprises a dedicated address mapping table which is stored in the non-volatile system memory 190 in association with the logical storage device. In some embodiments, the logical storage device layer 174 comprises a plurality of logical storage device layer instances, wherein each instance of the logical storage device layer 174 is configured to manage a respective one of the plurality of logical devices that are instantiated in the non-volatile system memory 190.

In addition, logical storage device layer 174 implements methods for creating/opening a file that is configured to store the data associated with a failed I/O write operation to a logical storage device in the non-volatile system memory 190. Moreover, the logical storage device layer 174 implements methods for creating and maintaining data structures to support logical-to-physical address mapping. In particular, the logical storage device layer 174 is configured to maintain an address mapping table data structure (e.g., a hash table) which is configured to map a logical address that is associated with a failed I/O write request with a physical address of the file that is written to the memory region of the associated logical storage device in the non-volatile system memory 190. In some embodiments, a separate address mapping table structure is generated and maintained for each logical storage device instance that is generated and maintained in the non-volatile system memory 190 for each storage device 180.

In some embodiments, the non-volatile system memory 190 is implemented using a non-volatile random-access memory (NVRAM) device, or other types of non-volatile memory. Further, in some embodiments, the non-volatile system memory 190 comprises a memory device that is configured and utilized by the processors of the storage node 140 as system memory. In this instance, the non-volatile system memory 190 is configured to have a dedicated region of memory which is used to maintain logical storage devices and associated address mapping tables. The dedicated region of memory in the non-volatile system memory 190 will have dedicated sub-regions of memory that are allocated to respective logical storage devices that are instantiated in the non-volatile system memory 190 for respective ones of the physical storage devices 180.

The amount of memory space that is allocated to the dedicated memory region of the non-volatile system memory 190 will vary depending on various factors such as the expected maximum amount of potential inflight I/O requests that can be performed concurrently by the given storage control system 150, the number of storage devices 180 managed by the storage control system 150, etc. The maximum amount of potential inflight I/O requests that can be concurrently handled by the storage control system 150 will depend on, e.g., available I/O-related resources such as memory, I/O thread, buffers, etc. In all instances, the amount of memory in the non-volatile system memory 190 which is allocated to the logical storage devices and associated address mapping tables, and other requisite metadata, should be sufficient to ensure that the storage control system 150 will not lose any data associated with failed I/O operations as a result of storage device failure.

When an I/O write operation fails for a given physical storage device, the logical storage device layer 174 will write a data file comprising the I/O write data to the logical storage device in the non-volatile system memory 190 which is associated with the given physical storage device for which a device I/O error was returned. The logical storage device layer 174 adds an entry into the associated address mapping table to map the target logical address of the I/O write request to the physical memory address in the non-volatile system memory 190. This mapping allows the storage control system 150 to determine the location of the data blocks of a given file in the non-volatile system memory 190 during a subsequent recovery process.

In some embodiments, the address mapping table for a given logical storage device is configured as a hash table or any other type of mapping data structure which supports the implementation of a dynamic address mapping scheme in which entries are dynamically added to the address mapping table for only those logical addresses of the failed storage device that are actually mapped into the memory of the associated logical storage device. The dynamic address mapping scheme is in contrast to a static address mapping scheme in which the address mapping table for the logical storage device would include entries for an entire range of offsets of the associated physical storage device (which would be a waste of memory in the non-volatile system memory device 190).

The logical storage device layer 174 can utilize any suitable layout architecture for storing data in the memory regions of the logical storage devices that are instantiated in the non-volatile system memory 190. For example, in some embodiments, the logical storage device layer 174 can organize the allocated region of memory for a given logical storage device as a log-structured array comprising log segments in which data files are sequentially written in free blocks of memory as data entries in the log segments, using known techniques.

It is to be noted that depending on the system configuration, there can be one or more additional storage devices that depend on the defective or malfunctioning storage device. For example, the defective or malfunctioning storage device can be configured as a primary storage device, wherein data written to the primary storage device is backed up/replicated to one or more backup/replica storage devices that are configured to maintain a backup/replica of the data of the primary storage device. In this instance, when the primary storage device has failed, a complete I/O write operation may be achieved when (i) the I/O write data is written to the logical storage device associated with the failed primary storage device, and (ii) a copy/replica of the I/O write data is written to one or more secondary storage devices which operate as backup/replica storage devices for the primary storage device.

It is to be noted that in its role of storing data of failed I/O write operations, the non-volatile system memory 190 differs in function from a "hot spare device" in the sense the non-volatile system memory 190 does not constitute a new storage device, or additional capacity, or a new state of the data storage system. Rather, the non-volatile system memory 190 serves as a virtual storage media that is separate from the storage devices 180. In addition, the implementation of the logical storage device layer 174 and the non-volatile system memory 190 does not take control of the data storage systems, but merely provides a mechanism to facilitate the resilience of write operations by seamlessly allowing the completion of failed I/O write operations to disk and, thus, the completion of associated transactions which would otherwise be lost as a result of storage device error. Moreover, the logical storage device layer 174 and the non-volatile system memory 190 differ fundamentally from a conventional write cache implementation in that the logical storage device layer 174 and the non-volatile system memory 190 are only utilized when a given storage device has failed and is out of service.

Figure 2:
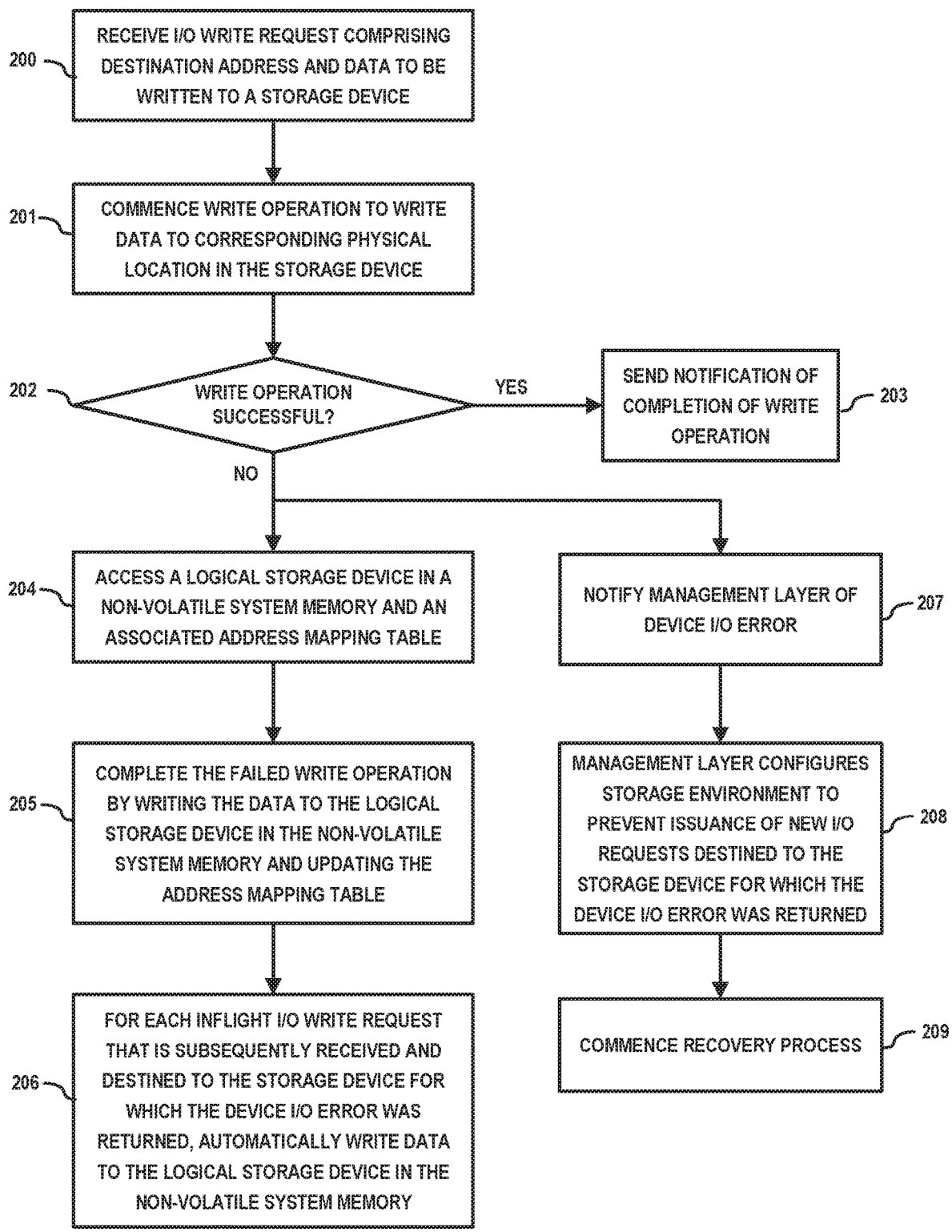
FIG. 2 is a flow diagram of a method for managing storage device errors during processing of inflight I/O operations, according to an exemplary embodiment of the disclosure.

FIG. 2 is a flow diagram of a method for managing storage device errors during processing of inflight I/O operations, according to an exemplary embodiment of the disclosure. For illustrative purposes, the process flow of FIG. 2 will be discussed in the context of the storage control system 150 of FIG. 1B. In this process flow, it is assumed that there is at least one open transaction which comprise a plurality of operations including inflight I/O operations that are being processed by the storage control system 150. Initially, the storage control system 150 receives an I/O write request from a given compute node (e.g., from a storage device client) to perform an I/O write operation to at least one target storage device (block 200). The I/O write request will include data to be written to the target storage device as well as relevant metadata including the destination address of at least one target storage device where the data is to be written. The file system 170 processes the I/O write request to determine the logical data blocks that correspond to the destination address, and then communicate with the device drivers 178 to write the data to the physical data blocks of the target storage device, which are mapped to the logical data blocks. A target device driver 178 will commence the write operation to write data to the corresponding physical location in the target storage device (block 201).

If the write operation is successful (affirmative result in block 202), the storage control system 150 can send notification to the requesting client that the write operation was successfully completed (block 203). In this instance, the file system 170 can notify the user that the write operation was completed using an ACK message. In some instances, the I/O write operation is part of a transaction that is implemented by performing other I/O operations. In such instances, the file system 170 can send an ACK message to the user as a transaction completion message.

On the other hand, if the write operation is not successful due to a storage device I/O error resulting from a failure of the write operation associated with the target storage device (negative result in block 202), notification of the storage device I/O error will be received by the API layer 172 and/or the logical storage device layer 174. In response to the storage device I/O error, the logical storage device layer 174 will execute a "file write" operation to perform the I/O write operation using the non-volatile system memory 190. In particular, the logical storage device layer 174 will access an associated logical storage device in the non-volatile system memory 190 and an associated address mapping table (block 204). The logical storage device layer 174 will then proceed to complete the failed write operation by writing the data to a file in the logical storage device in the non-volatile system memory 190 and updating the address mapping table to include an entry which maps the logical address (received destination address) to the physical address in the non-volatile system memory 190 where the file was stored (block 205).

In this configuration, if the open transaction is not yet completed, the storage control system 150 can continue to execute any remaining inflight I/O requests associated with the open transaction. In particular, in some embodiments, all inflight I/O read requests that are directed to data stored in the failed storage device will not be executed as such read operations are not prioritized. On the other hand, for each inflight I/O write request that is subsequently received by the file system 170 and which is destined to the failed storage device (e.g., the storage device for which the storage device I/O error was previously returned), the logical storage device layer 174 will intercept the inflight I/O write request and automatically perform a write operation to write the data to the associated logical storage device in the non-volatile system memory 190 and update the address mapping table accordingly (block 206).

In this instance, the failure or malfunction of a given storage device does not result in the abrupt termination of an ongoing process or transaction. Instead, the implementation of the logical storage device layer 174 and the non-volatile system memory 190 to handle inflight I/O write operations provides a mechanism for the open transaction and related processes to proceed without being terminated, and further allows other related or unrelated processes or transactions to complete before commencing a recovery operation or rollback. This allows the storage system to reach a stable and coherent state across all the storage devices and, thereby, facilitate a graceful shutdown and recovery process. In other embodiments, the one or more operations of an open transaction which encounter the storage device error can be rolled back if the system state would result in consistency or data coherency upon the rollback.

Furthermore, referring back to the determination block 202 of FIG. 2, when the write operation is unsuccessful and the storage device I/O error is returned (negative result in block 202), the storage control system 150 will provide notification to the management layer (e.g., management nodes 115) of the storage device I/O error that was returned for the given storage device (block 207). As noted above, there are many reasons that a storage device I/O error may occur such as a storage device hardware malfunction, a faulty connection, power failure of the storage device, etc. In response to the notification of the storage device I/O error, the management layer will perform certain operations to reconfigure the storage environment to prevent the clients (e.g., compute nodes 110, SDCs, etc.) from issuing new I/O requests for new transactions which are destined to the storage device for which the device I/O error was returned (block 208).

For example, the storage management layer can reconfigure the mapping metadata of the storage environment so that the clients direct new I/O requests to another storage control system (of another storage node 140) which comprises a storage device that has a backup or replica of the data stored in the failed storage device (e.g., the management nodes 115 direct the SDCs to another storage data server (e.g., storage control system) on another storage node 140). In this system configuration, all inflight I/O requests (e.g., inflight write requests) that are destined to the "failed" storage device for which the device I/O error was returned will be handled by the logical storage device layer 174 and the associated logical storage device in the non-volatile system memory 190 until such time that the management layer has successfully reconfigured the storage environment so that no further I/O requests will be directed to the failed storage device.

Once the open transaction is completed and the system is stabilized (e.g., all inflight I/O write requests have been performed, or otherwise rolled back such that the data storage system is in a coherent state), a recovery process can be commenced by a user and/or the management layer (block 209). A recovery process can be performed in various manners. For example, if the storage device I/O error is the result of a device hardware failure or malfunction, the failed storage device can be removed and replaced with a new storage device, and the internal structure of the storage layer will recover the data from another storage device. In particular, the new storage device can be repopulated with the data of the failed storage device by using a backup copy or replica copy of the data from another storage device. In this instance, the backup or replica storage devices may also have a copy of the data that was written to the logical storage device associated with the failed storage device, if the backup/replication operations were previously and successfully performed following the device I/O error.

In some embodiments, the management layer can commence a recovery process which involves re-attaching the storage device in the storage environment and recovering data from the associated logical storage device in the non-volatile system memory 190. For example, if the storage device I/O error is the result of a bad network connection, a power supply problem, or some other type of problem that is fixable (e.g., not related to a hardware failure or malfunction of the storage device itself), the problem can be fixed and the storage device can be re-attached in the recovery process. In this process, the data (e.g., delta data) stored in the associated logical storage device in the non-volatile system memory 190 can be copied to the re-attached storage device.

FIG. 3 schematically illustrates framework of a server node which hosts a data storage system that is configured to manage storage device errors during processing of an inflight I/O operations, according to an exemplary embodiment of the disclosure. More specifically, FIG. 3 schematically illustrates framework of a server node 300 (e.g., storage node 140, FIGS. 1A and 1B) which can be implemented for hosting a storage control system (e.g., the storage control system 150, FIG. 1B), according to an exemplary embodiment of the disclosure. The server node 300 comprises processors 302, storage interface circuitry 304, network interface circuitry 306, virtualization resources 308, system memory 310, and storage resources 316. The system memory 310 comprises volatile memory 312 and non-volatile memory 314.

The processors 302 comprise one or more types of hardware processors that are configured to process program instructions and data to execute a native operating system (OS) and applications that run on the server node 300. For example, the processors 302 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 304 enables the processors 302 to interface and communicate with the system memory 310, the storage resources 316, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 306 enables the server node 300 to interface and communicate with a network and other system components. The network interface circuitry 306 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 308 can be instantiated to execute one or more services or functions which are hosted by the server node 300. For example, the virtualization resources 308 can be configured to implement the various modules and functionalities of the storage control system 150 as shown in FIG. 1B as discussed herein. In one embodiment, the virtualization resources 308 comprise virtual machines that are implemented using a hypervisor platform which executes on the server node 300, wherein one or more virtual machines can be instantiated to execute functions of the server node 300. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 300, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 308 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 300 as well execute one or more of the various modules and functionalities of the storage control system 150 of FIG. 1B as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the various components, systems, and modules of the storage control system 150 and file system 170 comprise program code that is loaded into the system memory 310 (e.g., volatile memory 312), and executed by the processors 302 to perform respective functions as described herein. In this regard, the system memory 310, the storage resources 316, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 310 comprises various types of memory such as volatile RAM, NVRAM, or other types of memory, in any combination. The volatile memory 312 may be a dynamic random-access memory (DRAM) (e.g., DRAM DIMM (Dual In-line Memory Module), or other forms of volatile RAM. The non-volatile memory 314 may comprise one or more of a NAND Flash storage device, an SSD device, or other types of next generation non-volatile memory (NGNVM) devices. The system memory 310 can be implemented using a hierarchical memory tier structure wherein the volatile system memory 312 is configured as the highest-level memory tier, and the non-volatile system memory 314 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). In an exemplary embodiment, non-volatile memory 314 comprises the non-volatile system memory 190 shown in FIG. 1B.

The term "memory" or "system memory" as used herein refers to volatile and/or non-volatile system memory which is utilized to store application program instructions that are read and processed by the processors 302 to execute a native operating system and one or more applications or processes hosted by the server node 300, and to temporarily store data that is utilized and/or generated by the native OS and application programs and processes running on the server node 300. The storage resources 316 can include one or more HDDs, SSD storage devices, etc. In an exemplary embodiment, the storage resources 316 include the storage devices 180 shown in FIG. 1B.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
   managing, by a storage control system, a plurality of storage devices of a storage node;
   instantiating, by the storage control system, one or more logical storage devices, wherein each logical storage device is associated with a respective storage device of the plurality of storage devices, and wherein the one or more logical storage devices are maintained by the storage control system in a non-volatile memory device of system memory of the storage node;
   receiving, by the storage control system, an input/output (I/O) write request comprising data to be written to at least one storage device of the plurality of storage devices managed by the storage control system;
   commencing, by the storage control system, a write operation to write the data to the at least one storage device; and
   in response to a storage device I/O error resulting from a failure of the write operation associated with the at least one storage device, the storage control system:
   accessing a logical storage device in the non-volatile memory device of the system memory, which is associated with the at least one storage device for which the storage device I/O error was returned; and
   writing the data to the accessed logical storage device in the non-volatile memory device to complete the failed write operation.

2. The method of claim 1, wherein accessing the logical storage device in the non-volatile memory device of the system memory comprises:
   accessing a designated region of memory in the non-volatile memory device which is associated with the logical storage device; and
   updating an address mapping table for the logical storage device, wherein the address mapping table is configured to map a logical address to a physical address in the designated region of memory in the non-volatile memory device which is associated with the logical storage device.

3. The method of claim 2, wherein updating the address mapping table for the logical storage device comprises updating the address mapping table to map a destination address of the at least one storage device, as provided with the I/O write request, to a physical address in the designated region of memory in the non-volatile memory device where the data is stored in the logical storage device.

4. The method of claim 1, wherein the one or more logical storage devices are maintained in respective designated regions of the non-volatile memory device, and wherein each logical storage device comprises a dedicated address mapping table which is stored in the non-volatile memory device in association with the logical storage device.

5. The method of claim 1, further comprising:
   receiving, by the storage control system, a second I/O write request; and
   in response to determining, by the storage control system, that the second I/O write request is directed to the at least one storage device associated with the storage device I/O error, automatically writing data associated with the second I/O request to the associated logical storage device in the non-volatile memory device.

6. The method of claim 1, further comprising sending, by the storage control system, a notification of the storage device I/O error to a management node to enable the management node to reconfigure a storage environment to prevent at least one client node from issuing a new I/O request destined to the at least one storage device associated with the storage device I/O error.

7. The method of claim 1, further comprising performing, by the storage control system, a recovery process to recover from the storage device I/O error, wherein the recovery process comprises recovering data stored in the logical storage device in the non-volatile memory device.

8. An article of manufacture comprising a non-transitory processor-readable storage medium having stored therein program code of one or more software programs, wherein the program code is executable by one or more processors to implement a method comprising:
   managing, by a storage control system, a plurality of storage devices of a storage node;
   instantiating, by the storage control system, one or more logical storage devices, wherein each logical storage device is associated with a respective storage device of the plurality of storage devices, and wherein the one or more logical storage devices are maintained by the storage control system in a non-volatile memory device of system memory of the storage node;
   receiving, by the storage control system, an input/output (I/O) write request comprising data to be written to at least one storage device of the plurality of storage devices managed by the storage control system;
   commencing, by the storage control system, a write operation to write the data to the at least one storage device; and in response to a storage device I/O error resulting from a failure of the write operation associated with the at least one storage device, the storage control system:
  accessing a logical storage device in the non-volatile memory device of the system memory, which is associated with the at least one storage device for which the storage device I/O error was returned; and
  writing the data to the accessed logical storage device in the non-volatile memory device to complete the failed write operation.

9. The article of manufacture of claim 8, wherein the program code for accessing the logical storage device in the non-volatile system memory device of the system memory comprises program code that is executable by the one or more process to implement a process which comprises:
  accessing a designated region of memory in the non-volatile memory device which is associated with the logical storage device; and
  updating an address mapping table for the logical storage device, wherein the address mapping table is configured to map a logical address to a physical address in the designated region of memory in the non-volatile system memory device which is associated with the logical storage device.

10. The article of manufacture of claim 9, wherein the program code for updating the address mapping table for the logical storage device comprises program code that is executable by the one or more process to implement a process which comprises updating the address mapping table to map a destination address of the at least one storage device, as provided with the I/O write request, to a physical address in the designated region of memory in the non-volatile system memory device where the data is stored in the logical storage device.

11. The article of manufacture of claim 8, wherein the one or more logical storage devices are maintained in respective designated regions of the non-volatile memory device, and wherein each logical storage device comprises a dedicated address mapping table which is stored in the non-volatile system memory device in association with the logical storage device.

12. The article of manufacture of claim 8, further comprising program code that is executable by the one or more process to implement a process which comprises:
  receiving, by the storage control system, a second I/O write request; and
  in response to determining, by the storage control system, that the second I/O write request is directed to the at least one storage device associated with the storage device I/O error, automatically writing data associated with the second I/O request to the associated logical storage device in the non-volatile memory device.

13. The article of manufacture of claim 8, further comprising program code that is executable by the one or more process to implement a process which comprises sending, by the storage control system, a notification of the storage device I/O error to a management node to enable the management node to reconfigure a storage environment to prevent at least one client node from issuing a new I/O request destined to the at least one storage device associated with the storage device I/O error.

14. The article of manufacture of claim 8, further comprising program code that is executable by the one or more process to implement a process which comprises performing, by the storage control system, a recovery process to recover from the storage device I/O error, wherein the recovery process comprises recovering data stored in the logical storage device in the non-volatile memory device.

15. An apparatus, comprising:
  at least one processor; and
  a system memory configured to store program code, wherein the program code is executable by the at least one processor to implement a storage control system which is configured to:
    manage a plurality of storage devices of a storage node;
    instantiate one or more logical storage devices, wherein each logical storage device is associated with a respective storage device of the plurality of storage devices, and wherein the one or more logical storage devices are maintained by the storage control system in a non-volatile memory device of system memory of the storage node;
    receive an input/output (I/O) write request comprising data to be written to at least one storage device of the plurality of storage devices managed by the storage control system;
    commence a write operation to write the data to the at least one storage device; and
    in response to a storage device I/O error resulting from a failure of the write operation associated with the at least one storage device, the storage control system is configured to:
      access a logical storage device in the non-volatile memory device of the system memory, which is associated with the at least one storage device for which the storage device I/O error was returned; and
      write the data to the accessed logical storage device in the non-volatile memory device to complete the failed write operation.

16. The apparatus of claim 15, wherein in accessing the logical storage device in the non-volatile memory device of the system memory, the storage control system is configured to:
  access a designated region of memory in the non-volatile system memory device which is associated with the logical storage device; and
  update an address mapping table for the logical storage device, wherein the address mapping table is configured to map a logical address to a physical address in the designated region of memory in the non-volatile memory device which is associated with the logical storage device.

17. The apparatus of claim 15, wherein in updating the address mapping table for the logical storage device, the storage control system is configured to update the address mapping table to map a destination address of the at least one storage device, as provided with the I/O write request, to a physical address in the designated region of memory in the non-volatile system memory device where the data is stored in the logical storage device.

18. The apparatus of claim 15, wherein the one or more logical storage devices are maintained in respective designated regions of the non-volatile system memory device, and wherein each logical storage device comprises a dedicated address mapping table which is stored in the non-volatile memory device in association with the logical storage device.

19. The apparatus of claim 15, wherein the storage control system is further configured to send a notification of the storage device I/O error to a management node to enable the management node to reconfigure a storage environment to prevent at least one client node from issuing a new I/O request destined to the at least one storage device associated with the storage device I/O error.

20. The apparatus of claim 15, wherein the storage control system is further configured to perform a recovery process to recover from the storage device I/O error, wherein the recovery process comprises recovering data stored in the logical storage device in the non-volatile memory device.

* * * * *